(12) United States Patent
Salevan et al.

(10) Patent No.: US 8,001,247 B2
(45) Date of Patent: Aug. 16, 2011

(54) SYSTEM FOR TRIGGER-BASED "GATED" DYNAMIC VIRTUAL AND PHYSICAL SYSTEM PROVISIONING

(75) Inventors: Steven A. Salevan, Raleigh, NC (US); Wesley D. Hayutin, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 184 days.

(21) Appl. No.: 12/394,825

(22) Filed: Feb. 27, 2009

(65) Prior Publication Data

US 2010/0223383 A1 Sep. 2, 2010

(51) Int. Cl.
G06F 15/16 (2006.01)
(52) U.S. Cl. ........................................ 709/226; 709/232
(58) Field of Classification Search .................. 709/203, 709/219, 223–227, 229, 232
See application file for complete search history.

(56) References Cited

U.S. PATENT DOCUMENTS

| | | | | |
|---|---|---|---|---|
| 6,055,571 | A * | 4/2000 | Fulp et al. | 709/224 |
| 7,356,584 | B2 * | 4/2008 | Yip | 709/224 |
| 2003/0236854 | A1 * | 12/2003 | Rom et al. | 709/217 |
| 2004/0010592 | A1 * | 1/2004 | Carver et al. | 709/226 |
| 2006/0080707 | A1 * | 4/2006 | Laksono | 725/38 |
| 2007/0027983 | A1 * | 2/2007 | Bowra et al. | 709/224 |
| 2009/0178050 | A1 * | 7/2009 | Bichler et al. | 718/104 |

OTHER PUBLICATIONS

"Amazon Elastic Compute Cloud (Amazon EC2)", Amazon Web Services, (2010), 9 pages.
"Hitachi Data Systems—Hitachi Dynamic Provisioning Software", http://www.hds.com/products/storage-software/hitachi-dynamic-provisioning.html, printed from Internet on Feb. 16, 2010, 2 pages.
Urgaonkar, Bhuvan , et al., "Dynamic Provisioning of Multi-tier Internet Applications", Proc. of 2nd Int'l Conf. on Autonomic Computing, ICAC'05, 12 pages.

* cited by examiner

Primary Examiner — David Lazaro
(74) Attorney, Agent, or Firm — Lowenstein Sandler PC

(57) ABSTRACT

Computing resources are dynamically provisioned to virtual and physical systems. In one embodiment, a control system manages the provisioning of computing resources for multiple client systems. A request for resource provisioning can be sent to the control system as a trigger. The control system converts the information in the trigger into a demand curve that specifies the rates at which resources are to be provided to a client system. The control system then causes the resources to be provisioned to the client system based on the demand curve and a dynamic provisioning profile. The dynamic provisioning profile can be created by a system administrator based on the amount and characteristics of the resources available for provisioning the client system. The dynamic provisioning profile can also specify one or more gate points that indicate the thresholds at which dynamic provisioning can be stopped.

18 Claims, 5 Drawing Sheets

Long 'attack', short 'release'

Short 'attack', long 'release'

SYSTEM FOR TRIGGER-BASED "GATED" DYNAMIC VIRTUAL AND PHYSICAL SYSTEM PROVISIONING

TECHNICAL FIELD

Embodiments of the present invention relate to provisioning of computing resources, and more specifically, to dynamic provisioning of computing resources that are available over a network.

BACKGROUND

Various provisioning techniques have been developed to allow a user to obtain and configure the capacity of a computing system. The computing system can be provisioned or allocated with computing resources that are available over a network. The computing resources can include hardware resources (such as central processing units (CPUs), memory and storage) and software resources (such as virtual machines and operating systems). A user can scale up or down the capacity as the computing requirements change. For example, a user can set up a server without actually owning a server machine or an operating system. Instead, the user can request, through a web interface over a network, a scalable amount of CPU processing power and the necessary software according to actual demands. The user then only pays for the amount of usage.

In some scenarios, the computing demand of a user can fluctuate rapidly over a time period. For example, an online service may receive an unprecedented amount of traffic at some point. Then all of a sudden, the online service may see a lull in the traffic and may need to quickly release the resources that have already been provisioned. Conventional techniques sometimes have problems in providing computing resources that both satisfy the user's dynamic demands and protect the user's financial interests. As a result, cloud performance and cost effectiveness can become uncoupled, resulting in either sluggish performance due to a lack of provisioned resources or high costs from a cloud provider (such as Amazon EC2) when faced with unprecedented demand upon the cloud.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
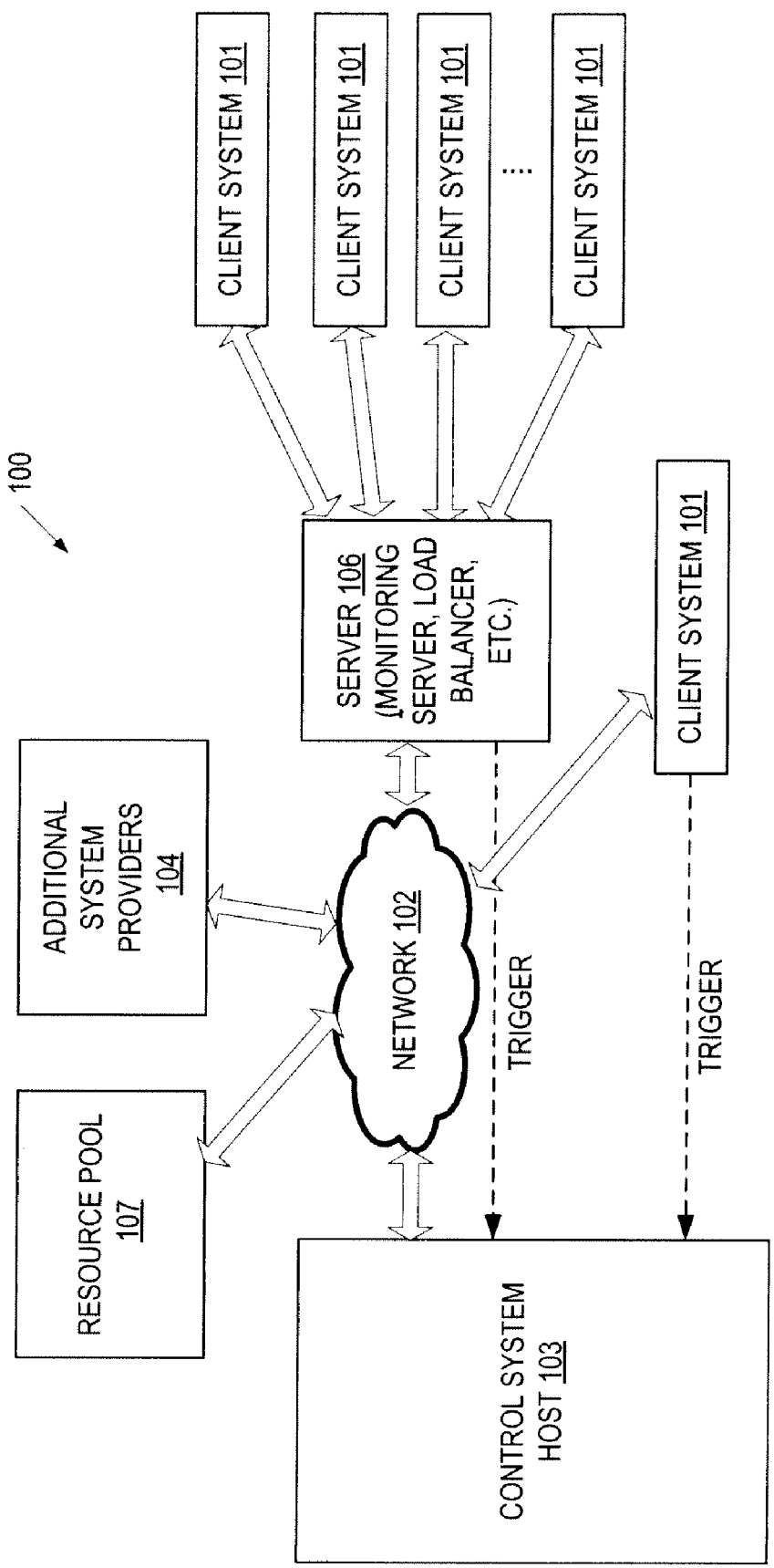
FIG. 1 illustrates an exemplary network architecture in which embodiments of the present invention may operate.

Described herein is a method and system for dynamic provisioning computing resources to virtual and physical systems. In one embodiment, a control system manages the provisioning of computing resources for a plurality of client systems. A request for resource provisioning can be sent to the control system as a trigger. The control system converts the information in the trigger into a demand curve that specifies the rates at which resources are to be provided to a client system. The control system then causes the resources to be provisioned to the client system based on the demand curve and a dynamic provisioning profile. The dynamic provisioning profile can be created by a system administrator based on the amount and characteristics of the resources available for provisioning the client system. The dynamic provisioning profile can also specify one or more gate points that indicate the thresholds at which dynamic provisioning can be stopped.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "causing", "converting", "notifying", "indicating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 includes a control system host 103 (also referred to as "host") coupled to one or more client systems 101 (also referred to as "clients") over a network 102. The client systems 101 may be coupled to the host 103 directly over the network 102, or through a server 106. The server 106 may be a monitoring server, a load balancer, a back-end server, a JAVA server, a management server, or any other server that is associated with one or more of the clients 101. Any number of servers 106 may exist in the network architecture 100. The host 103 may also be coupled to a resource pool 107 that contains computing resources, and may have access to an account for obtaining computing resources from additional system providers 104 (e.g., the Red Hat Network (RHN) Satellite System Group or Amazon Elastic Compute Cloud (EC2)). The computing resources include hardware and software resources, which can be provisioned to a virtual system (e.g., a system of virtual machines) or a physical system (e.g., a server machine). For example, the client 101 can be provisioned to host a virtual machine or a number of virtual machines, serving as a hypervisor that emulates an underlying hardware platform. Alternatively, the client 101 can be an allocated piece of hardware if it does not serve as a hypervisor.

The network 102 may be a private network (e.g., a local area network (LAN), wide area network (WAN), intranet, etc.) or a public network (e.g., the Internet).

In one embodiment, the clients 101 may include computing devices or systems that have a wide range of capabilities. Some of the clients 101 may be thin clients, which serve as access terminals for users and depend primarily on provisioned computing resources. A thin client has limited processing and memory capacities. For example, a thin client may be a laptop computer, cellular phone, personal digital assistant (PDA), a re-purposed desktop computer, etc. Some of the clients 101 may be thick (fat) clients, which have graphics processors, powerful CPUs and large memory. For example, a thick client may be a dual-core or multi-core computer, workstation, graphics workstation, etc. Fat clients can receive additional computing resources to cope with fluctuating computing demands. The computing resources provisioned to the clients 101 can be virtual machines, CPU cycles, memory, storage, etc. Any number of clients 101 may exist in the network architecture 100.

Some of the clients 101 may be managed by the server 106. For example, the server 106 may be a monitoring server of an organization that monitors the workload on the clients 101 owned by the organization. Alternatively, the server 106 may be a load balancer that balances the workload on the clients 101. In one scenario, the server 106 monitors the changes in the computing demand of the associated clients 101. When a change is detected, the server 106 can send a dynamic provisioning trigger (also referred to as "trigger") to the host 103 to request computing resources to be provisioned or de-provisioned. In another scenario, the server 106 can send the trigger in response to a request from the associated clients 101. Alternatively, the trigger can be sent directly to the host 103 by one of the clients 101, by a system administrator that has access to the host 103, or other input sources. The trigger can be sent via a pre-established protocol, such as an extensible markup language remote procedural call (XML RPC), or other application programming interface (API) or API-like interface. The interface can be generic by design to allow easy integration with pre-existing software, e.g., monitoring tools. The trigger can also be sent to the host 103 via an email, a short message service (SMS), by phone, or any per-established communication means.

Figure 2:
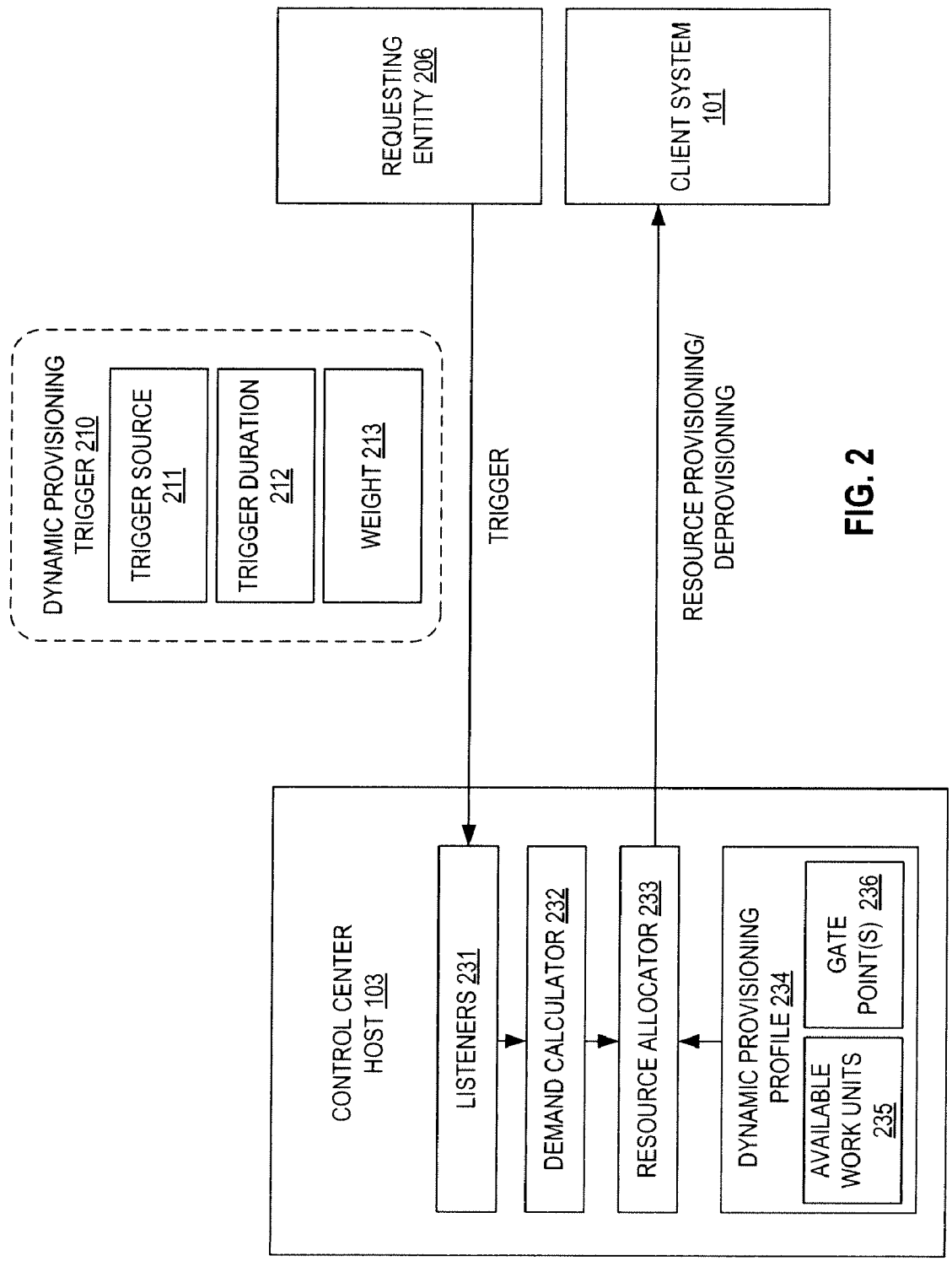
FIG. 2 is a block diagram illustrating one embodiment of a control system host that receives triggers, calculates demand curves and maintains a dynamic provisioning profile.

FIG. 2 is a block diagram illustrating an embodiment of the host 103 in greater detail. The host 103 includes one or more listeners 231 to receive triggers (e.g., a dynamic provisioning trigger 210) from a requesting entity 206. The requesting entity 206 can be the server 106, the clients 101, a system administrator, or other input sources. The host 103 also includes a demand calculator 232 to calculate a demand curve for provisioning and/or de-provisioning the computing resources. A resource allocator 233 in the host 103 determines the computing resources to be provisioned to or de-provisioned from the client 101, based on the calculated demand curve and a dynamic provisioning profile 234. In some embodiments, the resource allocator 233 may be a provisioning server that is separate from the host 103.

The dynamic provisioning profile 234 contains available work units 235, which is a number indicating the amount of resources available for provisioning the clients 101, and one or more gate points 236, which are numbers (e.g., integers) indicating a limit on the work units that can be dynamically provisioned. The dynamic provisioning profile 234 can be specified by a user; for example, a system administrator of the host 103. The user specifies the available computing resources; such as the number of virtual CPUs, hard disk space, and the amount of Random Access Memory (RAM). The host 103 converts the total available computing resources into a number of work units using predetermined criteria (e.g., a physical system that cannot provision a virtual machine can be converted to one work unit, a hypervisor can be converted to multiple work units based on the available resources in the hypervisor, etc.). A user can specify a work unit, in terms of CPUs, memory, and hard disk space, which can map to either a virtual or a physical system. If a physical system is not a hypervisor but exists in the pool of available resources, it can only allocate 1 work unit. However, if the physical system is a hypervisor, it can allocate an integer division of its available resources by the specified work unit. The conversion result is the available work units 235 in the dynamic provisioning profile 234. The user can also specify the gate points 236. When the number of the currently consumed work units reaches the specified gate points, dynamic provisioning will stop. At this point, the administrator can be prompted to switch to manual provisioning or to stop any further resource provisioning. The administrator can provide input to the host 103 via a predetermined method of communication; such as, SMS, e-mail, telephone calls, etc.

The host 103 can include multiple dynamic provisioning profiles 234. Each profile 234 can be associated with a particular group of requesting entities 206, a particular communication protocol for sending the triggers (e.g., XML RPC, email, SMS, etc.), or other characteristics known to the host 103. The dynamic provisioning profile 234 can include additional information, such as a set of triggers associated with the profile, and a set of data (e.g., an attack rate for resource provisioning and a release rate for resource de-provisioning) used by the demand calculator 232 to calculate a demand curve for the associated triggers.

The trigger 210 received from the requesting entity 206 includes a trigger source 211, a trigger duration 212 and a weight 213, which is a number indicating the requested work units 213. The triggers source 211 specifies the identity of the requesting entity 206 (e.g., a monitoring back-end, a load balancer or other entities) and/or means of communication (e.g., SMS, e-mail, XML RPC, etc.). The duration of the trigger 212 specifies the duration of time that the trigger lasts. Thus, multiple triggers from the same source in the specified duration will be counted as only one trigger and will not spawn a flurry of resource provision. The weight 213 is the amount (in work units) of new capacity requested. The weight 213 is converted by the demand calculator 232 into a demand curve that indicates how the requested work units are to be provisioned and de-provisioned. In some embodiments, the weight 213 is a weight function that indicates the number of work units to be provided to the requested entity 206 during a period of time. The weight 213 and the demand curve are described in greater detail in connection with FIGS. 3A-3C.

Figure 3A:
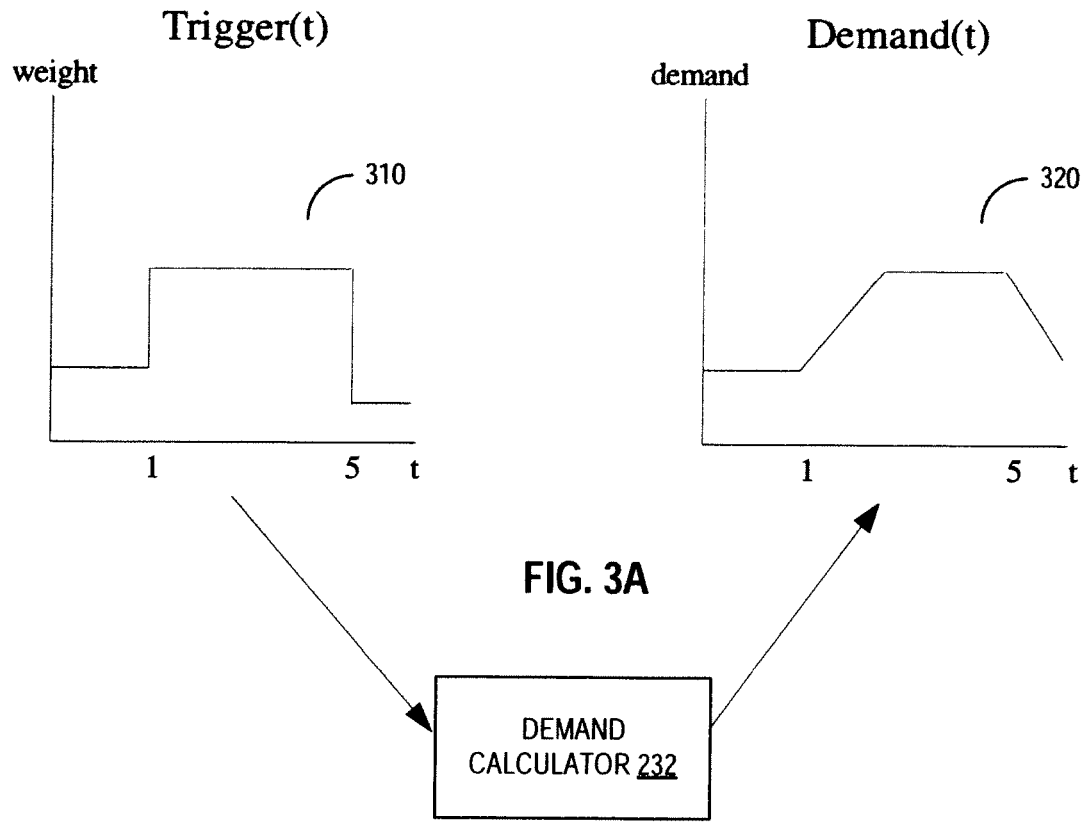
FIGS. 3A-3C are exemplary diagrams of demand curves.

FIG. 3A is a diagram showing an example of a demand curve. Referring to FIG. 3A, a received trigger specifies a weight function 310 that has weights 2, 5 and 1 at t=0, 1 and 5, respectively. The weight function 310 indicates the work units to be provisioned to and de-provisioned from a requesting system. In alternative embodiments, the weight function 310 may indicate the work units to be provisioned or de-provisioned. The requesting system initially has 2 work units, requests 3 additional work units at t=1, and needs only 1 work unit at t=5. The weight function 310 in this example is a stair function that has abrupt increase and decrease in slopes. The weight function 310 can be sent to the host 103 via one trigger that specifies the requested work units for the entire duration of t=0-5, or multiple triggers with each trigger specifying a requested change in weight (e.g., +3 work units at t=1, −4 work units at t=5, etc.). The demand calculator 232 converts the weight function 310 into a demand curve 320. The demand curve 320 specifies the rates at which resources are to be provisioned and de-provisioned at more gradual rates compared to the slopes of the weight function 310. The conversion can be performed based on a user-defined conversion function that spreads out a requested change over a time period to avoid sudden spikes in the amount of provisioned resources. The gradualness of the weight change, which is indicated by the length of the time spread, is designed such that the remaining work units in the system can be in parity with the provisioned work units. The user-defined conversion function can be stored in the dynamic provisioning profile 234.

Figure 3B:
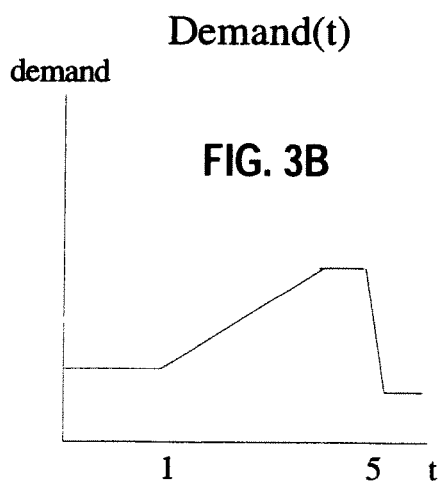

In one embodiment, the user-defined conversion function can include both an attack rate and a release rate, or either one of the two rates. Referring to FIG. 3B, an attack rate and the release rate can be set such that resources are provisioned at a slow rate, but released at a fast rate. Alternatively, in FIG. 3C, a user can specify the resources to be provisioned at a fast rate and then released at a slow rate. With the demand calculator 232, a user has the option to adjust the provision and de-provision rates according to the operating condition of the system.

Figure 4:
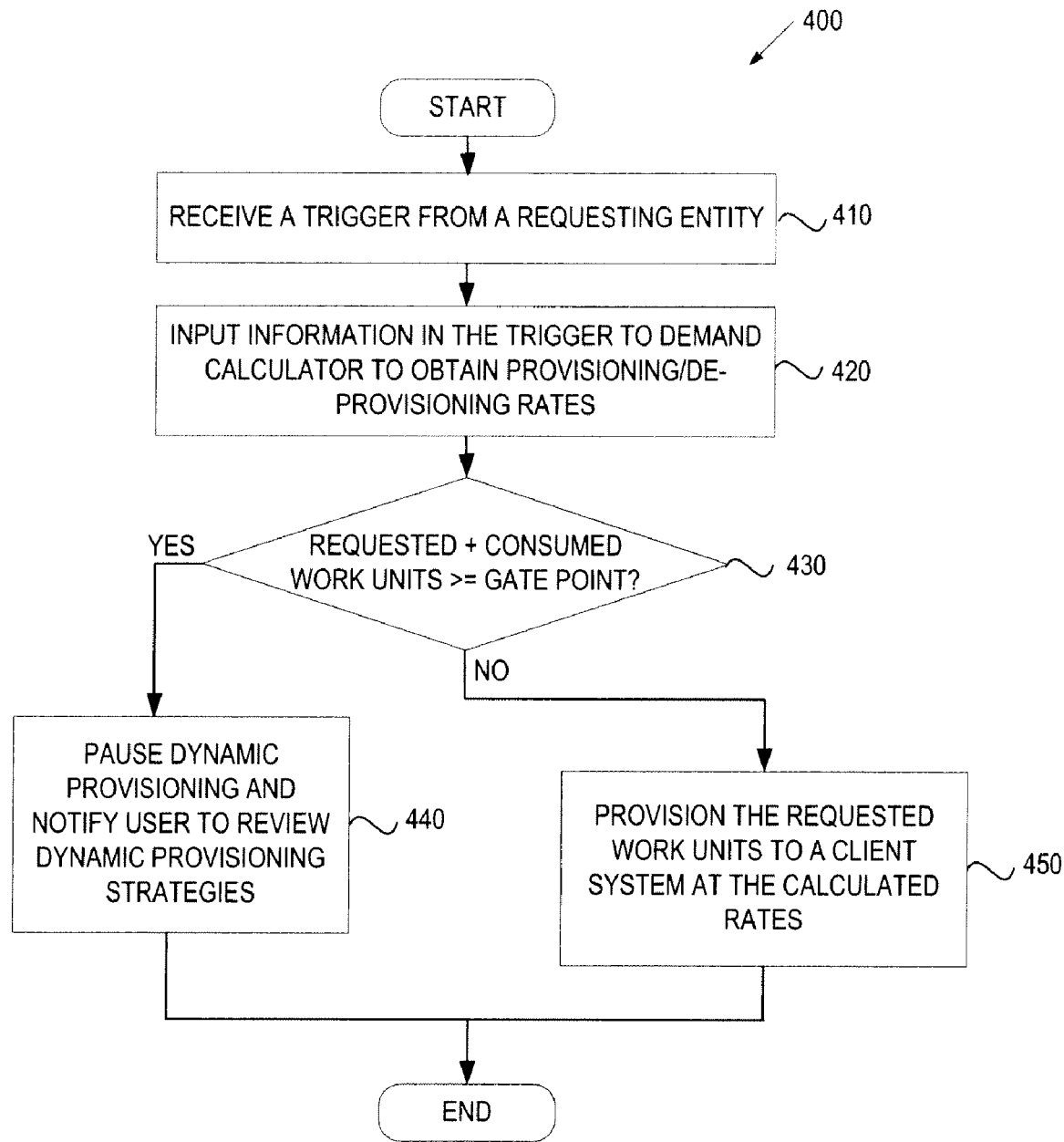
FIG. 4 is a flow diagram illustrating a method for provisioning/de-provisioning requested computing resources, in accordance with one embodiment of the present invention.

FIG. 4 is a flow diagram illustrating one embodiment of a method 400 for dynamic provisioning of computing resources. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the host 103 (FIGS. 1 and 2).

Figure 3C:
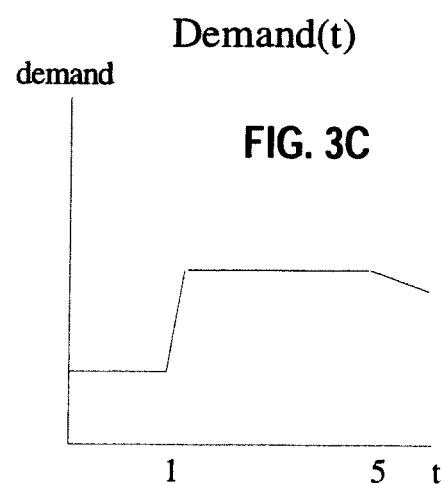

Referring to FIG. 4, at block 410, the host 103 receives a trigger from the requesting entity 206. At block 420, the information in the trigger is input to the demand calculator 232 to determine the rates at which the requested work units are to be provisioned and de-provisioned. The rates can be based on a user-specified attack rate and release rate (FIGS. 3B-3C). At block 430, the sum of the requested work units and the currently-consumed work units is compared with a gate point specified in the dynamic provisioning profile 234. If the sum of the work units is greater than or equal to a specified gate point, the dynamic provisioning stops and the user is notified to review dynamic provisioning strategies at block 430. At this point, the user can determine to switch to manual provisioning or to terminate any further resource provisioning. At block 440, if the sum is less than the specified gate point, then the requested work units will be provisioned to a client system at the calculated rates. At block 450, the method 400 then terminates.

In some embodiments, a plurality of gate points may be specified in the dynamic provisioning profile 234. When the sum of the requested and consumed work units reaches any one of the gate points, the user will be notified to decide whether to switch to manual provisioning or stop any further provisioning. Thus, the multiple gate points represent multiple decision points. If the user decides to continue with dynamic provisioning, the dynamic provisioning process will continue until the next gate point is reached. For example, if the gates points are 80, 50 and 30, which indicates the number of remaining work units available for provisioning, a user who decides to continue dynamic provisioning at gate point=80 can have the option to switch to manual provisioning at gate point=50 or 30.

Figure 5:
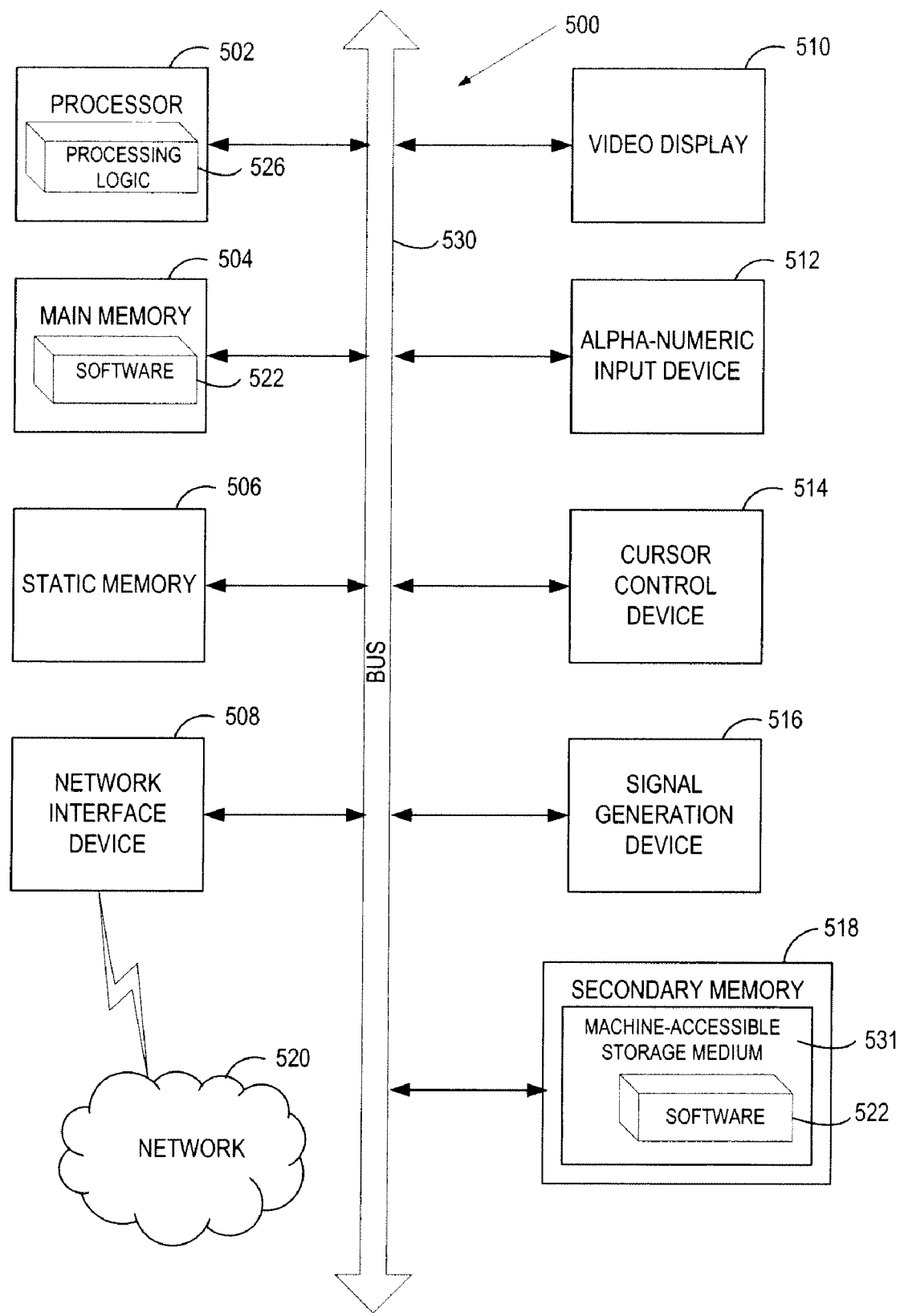
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500; the main memory 504 and the processing device 502 also constituting machine-readable storage media. The software 522 may further be transmitted or received over a network 520 via the network interface device 508.

The machine-readable storage medium 531 may also be used to store redirection module 136 (FIGS. 1 and 2). While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims.

Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method implemented by a computer system programmed to perform the following, comprising:
    receiving, by the computing system, a trigger for resource provisioning from a requesting entity, the trigger comprising a request for new capacity to be provisioned to a client system over a period of time;
    convening, by the computing system, information in the request into a demand curve that specifies a provisioning rate at which resources are to be provisioned to the client system over the period of time;
    causing, by the computing system, the resources to be provisioned to the client system based on the demand curve and a dynamic provisioning profile containing an amount of available resources and user-defined characteristics,
    wherein the dynamic provisioning profile includes at least one gate point, the method further comprising:
    pausing dynamic provisioning when the amount of remaining resources reaches the at least one gate point; and
    notifying a user to review dynamic provisioning strategies.

2. The method of claim 1, wherein the dynamic provisioning profile includes a plurality of gate points, the method further comprising:
    notifying a user when the amount of remaining resources reaches a first gate point;
    receiving a response from the user that indicates whether to dynamically provision the remaining resources; and
    in response to an indication to continue dynamical provisioning the remaining resources, dynamically provisioning the remaining resources until a next gate point is reached.

3. The method of claim 1, wherein creating a dynamic provisioning profile further comprises:
    designating each resource as having one or more work units according to the characteristics of the resource; and
    indicating the amount of available resources in the dynamic provisioning profile as a number of work units.

4. The method of claim 1, wherein the provisioning rate in the period of time has a more gradual slope than the new capacity requested in the period of time.

5. The method of claim 1, wherein information in the trigger includes a trigger duration, during which multiple triggers from the trigger source are counted as one trigger.

6. The method of claim 1, wherein information in the trigger includes a communication protocol with which the trigger is sent from the requesting entity.

7. The method of claim 1, wherein the demand curve further specifies a de-provisioning rate at which resources are to be de-provisioned from the client system.

8. A system comprising:
    computing resources including hardware resources and software resources;
    a control center host coupled to the computing resources, the control center host to receive a trigger that comprises a request from a requesting entity for new capacity to be provisioned to a client system over a period of time, and to cause the computing resources to be provisioned to the client system based on a demand curve and a dynamic provisioning profile that is created based on an amount and characteristics of the computing resources, the dynamic provisioning profile including at least one gate point, the control center host adapted to pause dynamic provisioning when the amount of remaining resources reaches the at least one gate point, and to notify a user to review dynamic provisioning strategies, wherein the control center host further comprises:

a demand calculator to convert information in the request into the demand curve that specifies a provisioning rate at which computing resources are to be provisioned to the client system over the period of time.

9. The system of claim 8, wherein the dynamic provisioning profile includes at least one gate point that sets the limit on the amount of computing resources that can be dynamically provisioned.

10. The system of claim 8, wherein each computing resource is designated as having one or more work units according to the characteristics of the computing resource.

11. The system of claim 8, wherein the requesting entity includes one or more of the following: a monitoring server, a load balancer, a back-end server, and a system administrator.

12. A non-transitory computer readable storage medium including instructions that, when executed by a processing system, cause the processing system to perform a method comprising:

receiving, by a computing system, a trigger for resource provisioning from a requesting entity, the trigger comprising a request for new capacity to be provisioned to a the client system over a period of time;

converting, by the computing system, information in the request into a demand curve that specifies a provisioning rate at which resources are to be provisioned to the client system over the period of time;

causing, by the computing system, the resources to be provisioned to the client system based on the demand curve and a dynamic provisioning profile containing an amount of available resources and user-defined characteristics, wherein the dynamic provisioning profile includes at least one gate point, the method further comprising:

pausing dynamic provisioning when the amount of remaining resources reaches the at least one gate point; and notifying a user to review dynamic provisioning strategies.

13. The computer readable storage medium of claim 12, wherein the dynamic provisioning profile includes a plurality of gate points, the method further comprising:

notifying a user when the amount of remaining resources reaches a first gate point;

receiving a response from the user that indicates whether to dynamically provision the remaining resources; and in response to an indication to continue dynamical provisioning the remaining resources, dynamically provisioning the remaining resources until a next gate point is reached.

14. The computer readable storage medium of claim 12, wherein creating a dynamic provisioning profile further comprises:

designating each resource as having one or more work units according to the characteristics of the resource; and indicating the amount of available resources in the dynamic provisioning profile as a number of work units.

15. The computer readable storage medium of claim 12, wherein the provisioning rate in the period of time has a more gradual slope than the new capacity requested in the period of time.

16. The computer readable storage medium of claim 12, wherein the information in the trigger includes a trigger duration, during which multiple triggers from the trigger source are counted as one trigger.

17. The computer readable storage medium of claim 12, wherein the information in the trigger includes a communication protocol with which the trigger is sent from the requesting entity.

18. The computer readable storage medium of claim 12, wherein the demand curve further specifies a de-provisioning rate at which resources are to be de-provisioned from the client system.

* * * * *